H. M. STEVENS.
ARMOR FOR INNER TUBES.
APPLICATION FILED FEB. 9, 1920.
1,343,418.
Patented June 15, 1920.
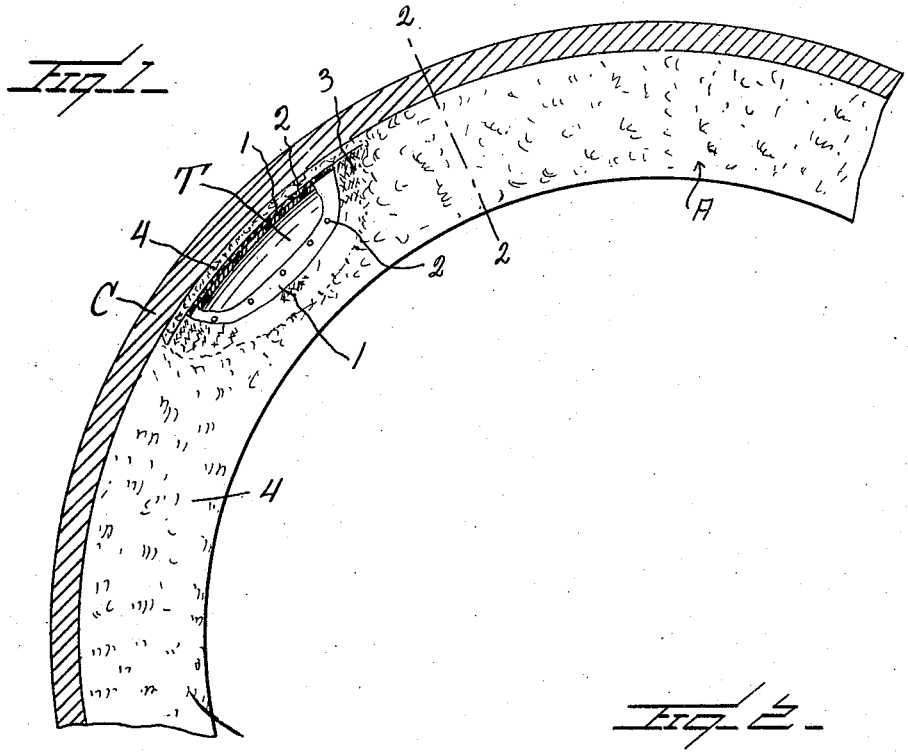
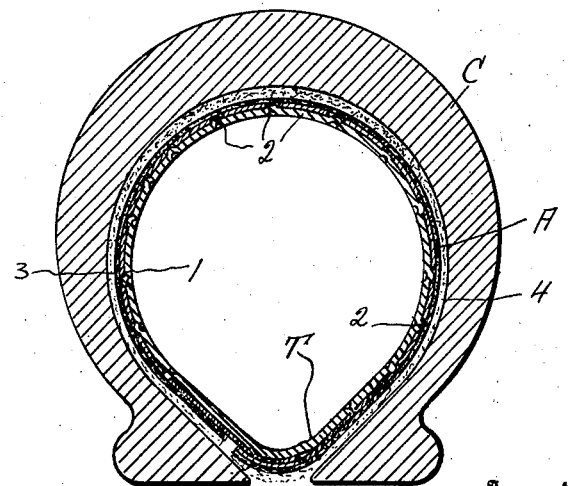
Inventor
H.M. Stevens
By Watson E. Coleman
Attorney

UNITED STATES PATENT OFFICE.

HOWARD MACK STEVENS, OF INDIANAPOLIS, INDIANA.

ARMOR FOR INNER TUBES.

1,343,418.   Specification of Letters Patent.   Patented June 15, 1920.

Application filed February 9, 1920. Serial No. 357,304.

*To all whom it may concern:*

Be it known that I, HOWARD MACK STEVENS, a citizen of the United States, residing at Indianapolis, in the county of Marion and State of Indiana, have invented certain new and useful Improvements in Armor for Inner Tubes, of which the following is a specification, reference being had to the accompanying drawings.

This invention relates to an armor for inner tubes, and it is an object of the invention to provide a novel and improved device of this general character adapted to be interposed between the inner tube and casing of a pneumatic tire to protect the inner tube against puncture or the action of a stone pocket in a casing.

Another object of the invention is to provide a novel and improved armor of this general character having means whereby the armor when in applied position, is held against slipping, independently of the inner tube, and which also serves as a medium to substantially insulate the inner tube from the heat generated when the assembled tire structure is in transit.

The invention consists in the details of construction and in the combination and arrangement of the several parts of my improved armor for inner tubes whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view, partly in section and partly in elevation, illustrating an armor constructed in accordance with an embodiment of my invention and in applied position;

Fig. 2 is a transverse sectional view taken through a tire structure with an armor applied therein; and Fig. 3 is a fragmentary transverse section taken through my improved armor as herein embodied.

As disclosed in the accompanying drawings, A denotes an armor constructed in accordance with an embodiment of my invention, and which is adapted to extend around the inner tube T, and to be positioned between said inner tube T and the casing C in an assembled tire structure.

The armor A comprises an inner lamination 1 preferably of rubber, having produced therein the openings or perforations 2 which afford pockets into which the adjacent portions of the tube T extend when the tire structure is inflated, and whereby the armor A is held against slipping independently of the inner tube. Overlying the lamination 1 is a second lamination 3, preferably of textile material, and carried by the outer face of said lamination 3 is a covering 4 of cotton, preferably raw.

In practise I prefer the armor A to be of a length substantially equal to one-quarter of the circumferential dimension of the tube T, although I do not wish to be limited in this respect. The armor A, or more particularly, the lamination 1 is of a width to permit its longitudinal marginal portions to overlap, if desired, or to be returned and clamped between the bead of the casing and the rim of the wheel structure to which the assembled tire structure may be applied.

When the armor A is in applied position, and the inner tube T properly inflated, the covering 4 will be tightly compressed against the casing C, whereby the penetration of a nail or other sharp or pointed member is prevented, as it has been fully demonstrated in practice that such nail or other member or object is retarded. The covering 4 is also of particular advantage in the event of a stone pocket. It is well known that when a casing runs over a stone or other rough place or obstruction the casing will be pressed or forced inwardly, forming what is generally termed a stone pocket. When the casing snaps back to its normal condition, it separates from the tube T. When the inner tube returns at this point to the casing, it often times occurs that a hole is snapped in the tube. The covering 4 eliminates this disadvantage in view of the fact that it serves as a cushion for the inner tube.

I also find it of importance to thoroughly mix graphite, talcum powder, soap suds and the like with the covering 4 of cotton, and preferably graphite. This results in materially overcoming the heat generated by friction between the casing C and the tube T when the assembled wheel structure is in transit. This mixing of the graphite or the like with the covering 4 also effectively protects the tube T from sand, dust, water or any other form of substance which may pass through an opening in the casing C, because the covering 4 will expand to effectively close the opening in the casing.

In applying my improved armor it is of advantage to remove all grit and sand, and otherwise thoroughly cleanse the inside of the casing C, and then apply my armor therein. The inner tube T is then thoroughly cleansed and placed within the armor. The assembled tire structure is then suitably positioned upon the wheel and inflated.

If desired the lamination 1 may comprise a mixture of rubber and canvas cloth, or a sheet of textile material having applied thereto a heavy coat of glue. It may also be of advantage to produce the lamination 1 from the inner laminations of a worn or otherwise unfit casing.

From the foregoing description it is thought to be obvious that an armor for inner tubes constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:

An armor for an inner tube comprising a lamination of elastic material adapted to extend around the tube, said lamination being provided with openings, a second lamination of elastic material overlying and secured to the outer face of the elastic lamination, and a covering of unwoven fiber carried by the outer face of the second lamination.

In testimony whereof I hereunto affix my signature.

HOWARD MACK STEVENS.